(12) United States Patent
Barrett (10) Patent No.: US 10,232,451 B2
(45) Date of Patent: Mar. 19, 2019

(54) FASTENER FOR SECURING AND CUTTING AN OBJECT AND METHODS RELATING THERETO

(71) Applicant: Brandon T. Barrett, Vallejo, CA (US)

(72) Inventor: Brandon T. Barrett, Vallejo, CA (US)

( * ) Notice: Subject to any disclaimer, the term of this patent is extended or adjusted under 35 U.S.C. 154(b) by 0 days.

(21) Appl. No.: 15/891,851

(22) Filed: Feb. 8, 2018

(65) Prior Publication Data

US 2018/0221971 A1    Aug. 9, 2018

Related U.S. Application Data

(60) Provisional application No. 62/456,107, filed on Feb. 8, 2017.

(51) Int. Cl.
| | |
|---|---|
| *B23P 11/00* | (2006.01) |
| *B23D 21/04* | (2006.01) |
| *B23B 5/16* | (2006.01) |
| *B23D 21/10* | (2006.01) |
| *B26D 7/00* | (2006.01) |
| *B26B 29/06* | (2006.01) |
| *B23Q 9/00* | (2006.01) |
| *B23D 47/04* | (2006.01) |
| *B26D 7/01* | (2006.01) |

(52) U.S. Cl.
CPC .............. *B23D 21/04* (2013.01); *B23B 5/167* (2013.01); *B23D 21/10* (2013.01); *B23Q 9/0042* (2013.01); *B26B 29/06* (2013.01); *B26D 7/0006* (2013.01); *B23D 47/045* (2013.01); *B26D 2007/013* (2013.01)

(58) Field of Classification Search
CPC . B23P 11/00; B23P 19/02; B23P 19/10; B23P 19/00
See application file for complete search history.

(56) References Cited

U.S. PATENT DOCUMENTS

| | | | |
|---|---|---|---|
| 4,402,136 A | 9/1983 | Rast | |
| 4,682,919 A | 7/1987 | Mitchell | |
| 5,161,789 A * | 11/1992 | Rogers | B25B 1/205 |
| | | | 269/108 |
| 5,894,772 A | 4/1999 | Nodar | |
| 5,918,866 A * | 7/1999 | Klimach | B25B 1/205 |
| | | | 269/108 |
| 6,209,859 B1 * | 4/2001 | Chung | B23K 3/087 |
| | | | 269/111 |

(Continued)

OTHER PUBLICATIONS http://www.tru-cutt.com/ website screen shots downloaded Feb. 15, 2018.

(Continued)

*Primary Examiner* — Lee D Wilson
(74) *Attorney, Agent, or Firm* — LeClairRyan (57) ABSTRACT

The present invention generally relates to fasteners for securing an object to produce a straight line cut of the secured object, including a square cut of a secured pipe. More particularly, the present invention relates to fasteners for securing objects of various sizes and/or shapes where the object may be in almost any location. The fastener has a gap to guide a saw blade to produce a straight-line cut of the secured object. In some instances, the fastener may retain both pieces of a cut workpiece in place after the workpiece is cut. In some instances, the fastener may prevent the saw blade from cutting beyond the fastener.

5 Claims, 11 Drawing Sheets

(56) References Cited

U.S. PATENT DOCUMENTS

| | | | |
|---|---|---|---|
| 6,450,491 B1 * | 9/2002 | McEvoy | B25B 5/068 |
| | | | 269/109 |
| 6,722,046 B2 | 4/2004 | Evenson | |
| 8,763,257 B2 | 7/2014 | Thorson et al. | |
| 9,574,697 B1 | 2/2017 | Wisehart | |
| 9,610,636 B2 | 4/2017 | Pierce et al. | |
| 9,636,836 B2 | 5/2017 | Pierce et al. | |
| 2006/0092674 A1 | 5/2006 | Belton et al. | |
| 2013/0333228 A1 | 12/2013 | Ota et al. | |

OTHER PUBLICATIONS https://www.reedmfgco.com/en/products/large-diameter-pipe-tools/ website screen shot downloaded Feb. 15, 2018.
http://www.techsouthinc.com/pipeclamps/sawguides.html website screen shot downloaded Feb. 15, 2018.

* cited by examiner

FASTENER FOR SECURING AND CUTTING AN OBJECT AND METHODS RELATING THERETO

CROSS REFERENCE TO RELATED APPLICATION

This application claims the benefit of U.S. provisional patent application No. 62/456,107 filed on Feb. 8, 2017, which is hereby incorporated by reference in its entirety.

BACKGROUND OF THE INVENTION

Existing fasteners attempt to secure objects for cutting a straight line. Often, however, they are unable to secure objects of various sizes and shapes to produce a straight-line cut, and they frequently fail to provide for safe cutting of a secured object.

Existing devices for producing a square cut of a pipe typically cannot secure the pipe unless the pipe is isolated, or separated and removed from surrounding items. Only after isolating the pipe can existing devices then cut the pipe.

Existing devices also typically allow the cut portion to fall off or away from the object that is being cut. There are instances where it is desirable to retain both sides of the cut object in place after cutting the object.

Existing devices for cutting objects may be used to cut vehicles to free persons trapped inside. However, these existing devices do not have a way to stop the cutting blade at a particular location, which may be important when cutting an object located near a person.

What is needed is an improved fastener that can secure objects of various sizes and shapes without the need to separate the object from its surroundings, and that can then allow for a straight-line cut of an object in almost any location, and that can provide for safe cutting of the object by providing a stop for the cutting blade, and that optionally may retain both parts of the cut object after cutting.

BRIEF SUMMARY OF THE INVENTION

The present invention generally relates to fasteners for securing an object or workpiece to produce a straight line cut of the secured workpiece, including a square cut of a secured pipe. More particularly, the present invention relates to novel fasteners for securing workpieces of various sizes and/or shapes in almost any location while providing a gap to guide a saw blade used cut the secured workpiece in a straight line. In some embodiments, the fastener size may be expanded or reduced by adding or removing fastening segments to accommodate differently sized objects. And, in some instances, the fastener will retain both pieces of a cut workpiece in place, after the workpiece is cut.

The present invention comprises a fastener that can securely grip and hold a workpiece where the workpiece may have a variety of shapes and sizes. The fastener has at least three fastening segments, where a first fastening segment connects via a hinge mechanism with a second fastening segment, and the second fastening segment connects via a hinge mechanism with a third fastening segment. There are no hinge mechanisms between the first and third fastening segments. Instead, the first fastening segment and the third fastening segment each has an engaging end at the end opposite the hinge mechanism end. The engaging end comprises an engaging head and a tensioning belt connection. The tensioning belt may be opened so that the first fastening segment and the third fastening segment are separate from each other, allowing the device to be positioned to surround a workpiece.

In one embodiment with three fastening segments the device will have a substantially triangular shape when the first and third fastening segments are connected using the tensioning belt. In this embodiment, the second fastening segment has a hinge mechanism at each end, while the first fastening segment and the third fastening segment each has a hinge mechanism at one end and a tension belt connection at the other end.

In other embodiments, with more than three fastening segments, the second fastening segment may connect via the hinge mechanism to another fastening segment similar to the second fastening segment, with a hinge mechanism at each end. A plurality of fastening segments with hinge mechanisms at each end may be added to make the device as large as is needed. Similar, fastening segments may be removed to reduce the size of the fastener, to accommodate smaller sized objects.

Each fastening segment is comprised of two gripping arms positioned parallel to each other each with a surface that faces the other gripping arm and a gap between the surfaces of the gripping arms that face each other. The surfaces that face each other preferably are comprised of metal, or other cut-resistant material, and form a width dimension of the gap so that the gap is of sufficient width to allow a saw blade to fit between the gripping arms.

The hinge mechanism between fastening segments also allows a saw blade to pass through the hinge mechanism. A hinge mechanism is comprised of a connector with a hinge at each end of the connector. By way of example, a connector connects, through a first hinge, a first gripping arm on a first fastening segment with the connector, and the connector connects through a second hinge a first gripping arm on a second fastening segment with the connector. Likewise, a second gripping arm on the first fastening segment is connected via a second connector to the second gripping arm on the second fastening segment. A hinge connects each end of the connector to a hinge on the respective gripping arm. There is a width dimension forming a gap between the first and second hinge mechanisms, where the gap is of sufficient width to allow a saw blade to pass between the first and second hinge mechanism. There is a continuous gap between the two connectors and the two gripping arms of each fastening segment.

To use the device, the fastener of positioned around a workpiece so that each fastening segment is in contact with the workpiece, preferably by having gripping teeth on each gripping arm in contact with the workpiece. The tensioning belt is used to connect the first fastening segment with the third fastening segment. A ratchet clip may be used to ratchet the tensioning belt tighter and tighter until the workpiece is securely gripped by at least some gripping teeth on each of the fastening segments.

A width dimension between two hinge mechanisms and a width dimension between two gripping arms forms a gap that allows a saw blade to fit between hinge mechanisms and the associated gripping arms of each fastening segment. In use, the device is positioned around and secured to a workpiece, a saw blade is inserted into the gap between the first and second hinge mechanism, the saw blade moves through the gap between the two hinge mechanisms, and progresses onto the gap between the first and second gripping arms, and the workpiece may be cut.

The cut-resistant surfaces on each gripping arm that faces the gap between the two gripping arms of each fastening segment keep the saw blade cutting in a straight and true line through the workpiece.

The saw blade may progress and cut as far as desired, but no farther than the connection between the first and third fastening segments.

As discussed above, the first fastening segment and the third fastening segment each has a hinge mechanism at one end and an engaging end at the opposite end. Each engaging end of the first and third segment has an engaging head with a spacer that extends into the gap between the gripping arms. The spacer is preferably made of metal or other cut-resistant material so that spacer will not be cut if the saw blade encounters the spacer. When the first and third segments are connected and engaged, the spacers connected with engaging heads and the engaging heads located at the end of the first segment and third segments prevent a saw blade from cutting beyond the spacers. This safety feature helps ensures that the saw blade will not pass beyond the engaging ends of the first and third fastening segments.

In some instances, the fastener may be used to cut an object, and will retain both pieces of the cut object after cutting.

In some instances, the fastener may be used to cut objects near a person, for example, a person trapped inside a vehicle. In these instances, the engaging ends of the first and third fastener are positioned near the person thereby preventing the saw blade from accidentally passing through the fastener and risking a cut to the person.

DETAILED DESCRIPTION OF THE INVENTION

In the following description, numerous specific details are set forth in order to provide a thorough understanding of the present invention. It will be apparent, however, to one skilled in the art that the present invention is practiced without limitation to some or all of these specific details.

Figure 1:
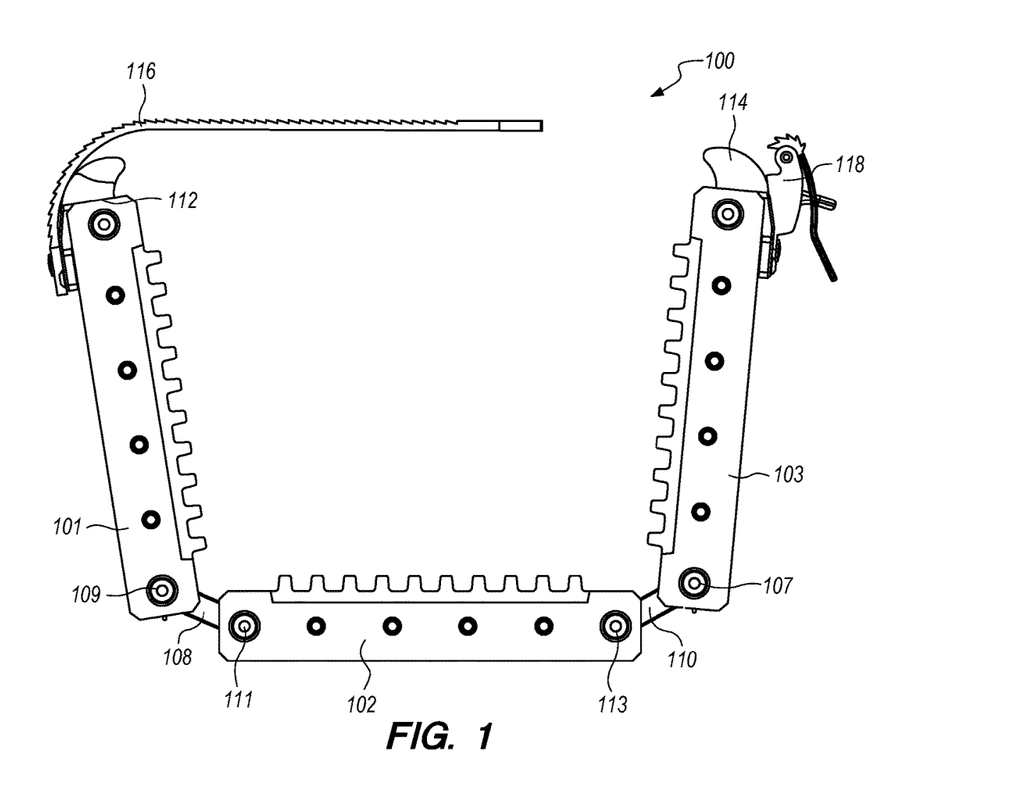
FIG. 1 shows is an elevational view of a fastener, according to one embodiment of the present arrangements that includes three fastening segments.

FIG. 1 shows a fastener 100, according to one embodiment of the present arrangements. Fastener 100 includes three fastening segments, a first fastening segment 101, a second fastening segment 102, and a third fastening segment 103. Each of first fastening segment 101 and third fastening segment 103 is referred to as an "engaging fastening segment" because they include features that are described in greater detail below and that allow each of the engaging fastening segments to engage with the other. Engaging fastening segments have an engaging end and a non-engaging end which is the hinge mechanism end. The hinge mechanism end does not engage via engaging features with another fastening segment. Rather, at the hinge mechanism end, the engaging fastening segment couples to a "non-engaging fastening segment". Non-engaging fastening segments are those fastening segments that do not include an engaging feature, they have a hinge mechanism at each end.

In accordance with one embodiment of an operative state the engaging features of engaging fastening segments 101 and 103 engage with each other to secure a workpiece within fastener 100.

Engaging features, according to one embodiment of the present arrangements, include a tensioning belt 116 and ratcheting clip 118. As shown in FIG. 1, the engaging end of engaging fastening segment 101 is coupled to tension belt 116 and the engaging end of engaging fastening segment 103 is coupled to ratcheting clip 118. In an operative state of the fastener of the present arrangements ratcheting clip 118 receives and engages tensioning belt 116, which engages first fastening segment 101 with third fastening segment 103 to form a closed-loop configuration of fastener 100. Ratcheting clip 118 secures tensioning belt 116 in place, so that it will not loosen during use of the fastener 100. It is apparent that tensioning belt 116 and ratcheting clip 118 may be any strap and lock mechanism that may be secured, connected and tightened.

In another embodiment of the present arrangements, each engaging end of fastening segments 101 and 103 an engaging head that may provide as an additional structural rigidity. By way of example, the engaging end of first fastening segment 101 is fitted with a male engaging head 112 and the engaging end of third fastening segment 103 is with a female engaging head 114. As will be described in greater detail below with respect to FIG. 8, during one operative state of fastener 100, male engaging head 112 of first fastening segment 101 engages with female engaging head 114 of third fastening segment 103. Further, in this operative state, the structural rigidity of the closed-loop configuration of fastener 100 is enhanced. In this operative state, fastener 100 more effectively secures or grips a workpiece and during a cutting operation, fastener 100 is less likely to move in relation to the secured workpiece.

Non-engaging end of first fastening segment 101 includes a hinge 109, and non-engaging end of third fastening segment 103 includes a hinge 107. Hinge 109 couples a first hinge mechanism 108 to first fastening segment 101. Hinge connection 111 couples first hinge mechanism 108 to second fastening segment 102. Similarly, hinge 107 couples a second hinge mechanism 110 to third fastening segment 103. Hinge connection 113 couples second hinge mechanism 110 to second fastening segment 102. In this configuration, fastening segments 101, 102, and 103 are coupled to each other using hinge mechanisms 108 and 110. It is important to note that in this arrangement of fastener 100, each of the fastening segments that are coupled to a fastening mechanism are capable of pivoting around the hinge connection that couples to that hinge mechanism. By way of example, first fastening segment 101 is capable of pivoting around hinge 109 that facilitates connection to first fastening mechanism 108. As another example, third fastening segment 103 is capable of pivoting around hinge 107 that facilitates connection to second fastening mechanism 110.

As explained above, second fastening segment 102 is a non-engaging fastening segment and does not include an engaging feature. In other words, each end of second fastening segment 102 is a non-engaging end connected with hinge mechanisms. One non-engaging end of second fastening segment 102 may be coupled to the non-engaging end of first fastening segment 101 and the second non-engaging end of second fastening segment 102 may be coupled to the non-engaging end of third fastening segment 103. As described above, one non-engaging end of second fastening segment 102 includes a hinge 111 and the other non-engaging end includes hinge 113. Using these hinges, second fastening segment 102 is capable of pivoting about hinge connections 111 and/or 113. This arrangement of fastener represents a preferred arrangement of the present invention. Specifically, hinge mechanisms 108 and 110 allow each coupled fastening segment to pivot or rotate, about an associated hinge connection, independently of the other coupled fastening segment. In this manner, fastener 100 provides multiple pivot points that allow fastening segments in fastener 100 to adapt to and secure various sizes and/or different shapes of the workpiece.

Figure 2:
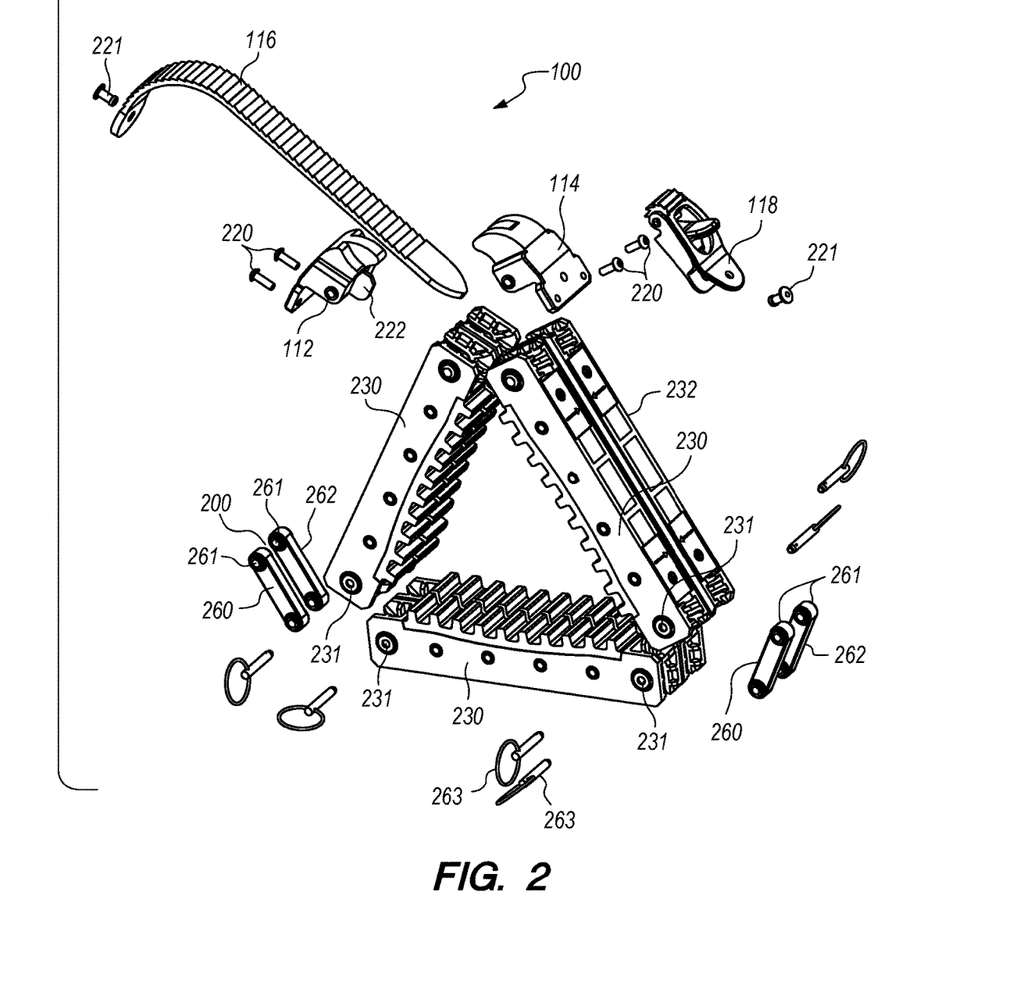
FIG. 2 shows an exploded and perspective view of an embodiment of the fastener with three fastening segments.

A hinge may be any apparatus that secures first hinge mechanism 108 and second hinge mechanism 110 to a hinge (e.g., hinge 107, 109, 111, and 113 as shown in FIG. 1). In some embodiments, the hinge may quickly engage/disengage the hinge mechanisms 108 and 110 with fastening segments 101, 102, and 103. By way of example, the hinge may be a ball-lock pin 263, as shown in FIG. 2. In other embodiments, the hinge may permanently connect the hinge mechanisms (e.g. 108 and 110) with the fastening segments, as shown in FIG. 1.

FIG. 2 shows an exploded view of an embodiment of fastener 100, with three fastening segments forming a substantially triangular shape, and showing additional details and components.

Each of first fastening segment 101, second fastening segment 102, and third fastening segment 103 include two complementary and sequentially disposed gripping arms. The two complementary and sequentially disposed gripping arms form a set of gripping arms.

Figure 5:
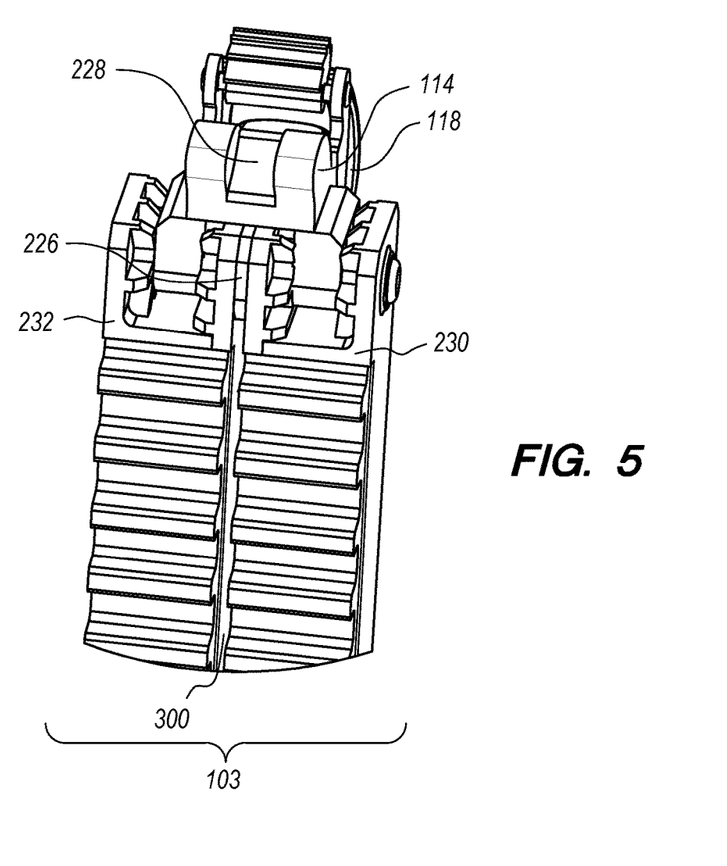
FIG. 5 shows a close-up perspective view of the female engaging head of the fastener connected with two gripping arms.

By way of example, third fastening segment 103 includes a first gripping arm 230 and a second gripping arm 232. In this example, first gripping arm 230 is disposed adjacent to second gripping arm 232 and at least a portion of one surface of first gripping arm 230 faces at least a portion of one surface of second gripping arm 232. In this configuration, a gap 300 is defined between first gripping arm 230 and second gripping arm 232, as shown in FIG. 5. As will be explained below, during an exemplar operative state of fastener 100, at least a portion of a cutting tool accesses, through the gap 300 between first gripping arm 230 and second gripping arm 232, a workpiece that is to undergo cutting.

Figure 11:
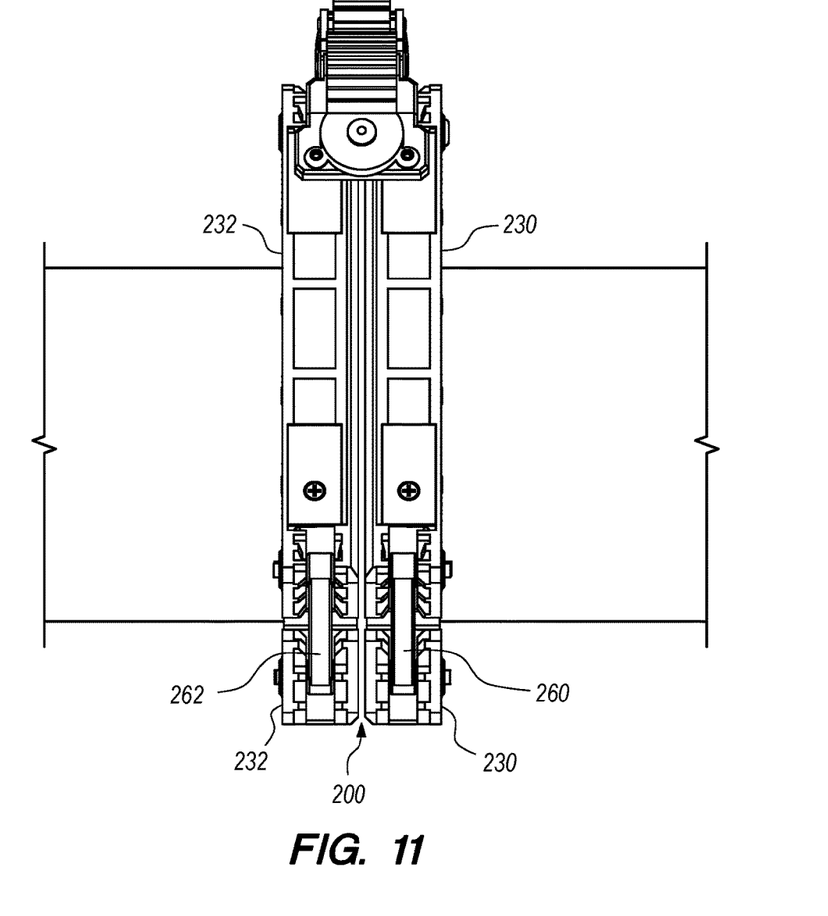
FIG. 11 shows a partial view of the fastener in an operative state, after cutting a workpiece, and retaining both sections of the cut workpiece between the gripping arms of each fastening segment.

In one embodiment of the present arrangements, each of first hinge mechanism 108 and second hinge mechanism 110 include multiple connectors. As shown in FIGS. 2 and 11, in one embodiment, first hinge mechanism 108, by way of example, includes two complementary connectors, a first connector 260 and a second connector 262. First connector 260 is disposed adjacent to and independent of second connector 262, with gap 200 between them. First connector 260 couples first gripping arm 230 of second fastening segment 102 to a corresponding first gripping arm of first fastening segment 101. Similarly, second gripping arm 232 of second fastening segment 102 is coupled, using second connector 262, to a corresponding second gripping arm of first fastening segment 101. First connector 260 and second connector 262 allows first gripping arm 230 of second fastening segment 102 and the first gripping arm of first fastening segment 101 to move independently of second gripping arm 232 of second fastening segment 102 and the second gripping arm of first fastening segment 101.

Similar to first hinge mechanism 108, second hinge mechanism 110 also includes two complementary with a gap 200 between them. A first connector 260 couples first gripping arm 230 of second fastening segment 102 to a corresponding first gripping arm of third fastening segment 103. A second connector 262 couples second gripping arm 232 of second fastening segment 102 to a corresponding second gripping arm of third fastening segment 103. In this arrangement, as explained above, the first gripping arms of first and second fastening segments 102 and 103 are capable of independent movement relative to second griping arms of first and second fastening segments 102 and 103. Likewise, the first gripping arms of first and second fastening segments 101 and 102 are capable of independent movement relative to second griping arms of first and second fastening segments 101 and 102. This feature of the present arrangement also allows fastener 100 to adapt and grip/secure various sizes and/or different shapes of the workpiece. In this way, each gripping arm may slightly out-of-alignment to allow for gripping objects that have uneven surfaces. Moreover, in an operative state of fastener 100 that uses these features of complementary connectors and sequentially disposed gripping arms, the fastener is less likely to move in relation to the secured workpiece.

According to the present arrangements, a connector gap 200 is defined between first connector 260 and second connector 262. Connector gap 200 in the same plane as, and contiguous with, gap 300 between a first gripping arm 230 and a second gripping arm 232, and allows a cutting tool to access a workpiece that is secured by the fastening segments.

The ball-lock pin 263 shown in FIG. 2 may be used to easily add or remove non-engaging fastening segments. By way of example, connector 260 is positioned between the outward face of gripping arm 230 and the inside face 270 of gripping arm 230, in space 233, shown in FIGS. 6 and 11. Ball-pin lock 263 may be inserted into, and pass through, hole 231 of an outward face of gripping arm 230. Ball-pin lock 263 then is inserted into hole 261 of connector 260.

Ball-pin lock 263 secures connector 260 to gripping arm 230, and does not pass beyond the inside face of connector 260. Similarly, and by way of example, connector 262 is positioned between the outward face of gripping arm 232 and the inside face 272 of gripping arm 232, in space 237, shown in FIGS. 6 and 11. Ball-pin lock 263 may be inserted into, and pass through, hole 231 of an outward face of gripping arm 232. Ball-pin lock 263 then is inserted into hole 261 of connector 262. Ball-pin lock 263 secures connector 262 to gripping arm 232, and does not pass beyond the inside face of connector 262; it does not pass into gap 200. Gap 200 remains unobstructed by this hinge mechanism.

In other embodiments, the hinge may provide a permanent connection between the connector and gripping arm. In these embodiments, as above, the hinge does not impinge or enter into gap 200.

Fastener 100 may include one or more securing components to secure an engaging feature (e.g., tensioning belt 216 and ratcheting clip 218) and/or a fastening head (e.g., male engagement head 212 and female engagement head 214) to an engaging fastening segment (e.g., first fastening segment 101 and third fastening segment 103). By way of example, rivet 221 may be used to secure a first end of tensioning belt 216 to male engagement head 112. Likewise, rivet 221 may be used to secure ratcheting clip 218 to female engagement head 114. Rivets 220 may be used to secure male engagement head 112 to first fastening segment 101. Likewise, rivets 220 may be used to secure female engagement head 114 to third fastening segment 103.

Figure 3:
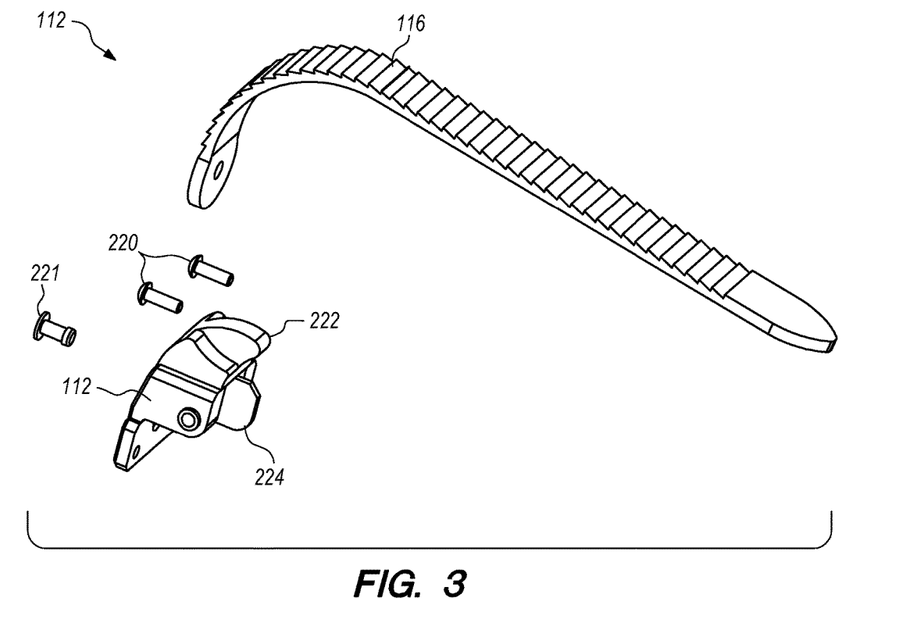
FIG. 3 shows an exploded and perspective view of a tensioning belt and a male engaging head of the fastener.

FIG. 3 shows a close-up view of tensioning belt 116 and male engagement head 112, according to one embodiment of the present arrangements. Male engagement head 112 includes a protruding portion 222 that, in one exemplar operative state, engages with a recessed portion 228 of female engagement head 114, shown in FIG. 4.

Male engagement head 112 further includes spacer 224. When male engagement head 112 is fitted to first fastening segment 101, spacer 224 is positioned between the first gripping arm 230 and the second gripping arm 232 of first fastening segment 101, as shown in the exploded view in FIG. 2. The thickness of spacer 224 preferably defines the thickness of the gap 300 between the first gripping arm 230 and the second gripping arm 232. The present arrangements contemplate spacer 224 to be of any thickness. As a result, the corresponding gap 300 between a first and second gripping arm may be of any thickness that is suitable to provide a cutting tool access to a workpiece.

Figure 4:
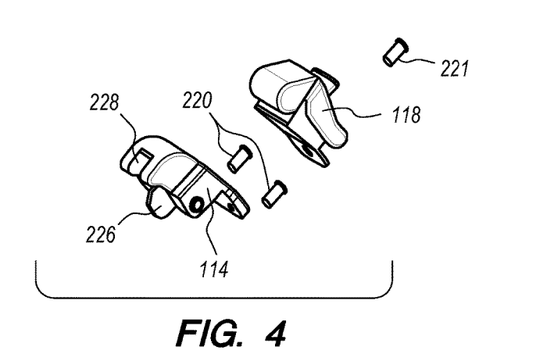
FIG. 4 shows an exploded and perspective view of a ratcheting clip and a female engaging head of the fastener.

FIG. 4 shows female engagement head 114 and a ratcheting clip 118. FIGS. 4 and 5 show female engagement head 114 with a recessed portion 228 that, in one operative state, may receive and engage with protruding portion 222 of male engagement head 112. In this engaged configuration, first fastening segment 101 and third fastening segment 103 are coupled together to form the closed-loop configuration mentioned above.

Female engagement head 114 also includes a spacer 226, which is substantially similar to spacer 224. Spacer 226 defines the thickness of the gap 300 between the first gripping arm 230 and the second gripping arm 232 of a fastening segment. Similar to spacer 224, the present arrangements contemplate spacer 226 to be of any thickness. As a result, the corresponding gap 300 between a first and second gripping arm may be of any thickness that is suitable to provide a cutting tool access to a workpiece.

FIG. 5 shows a close up view of the engaging end of fastening segment 103, with female engagement head 114 and spacer 226 defining gap 300 between gripping arm 230 and gripping arm 232.

Figure 6:
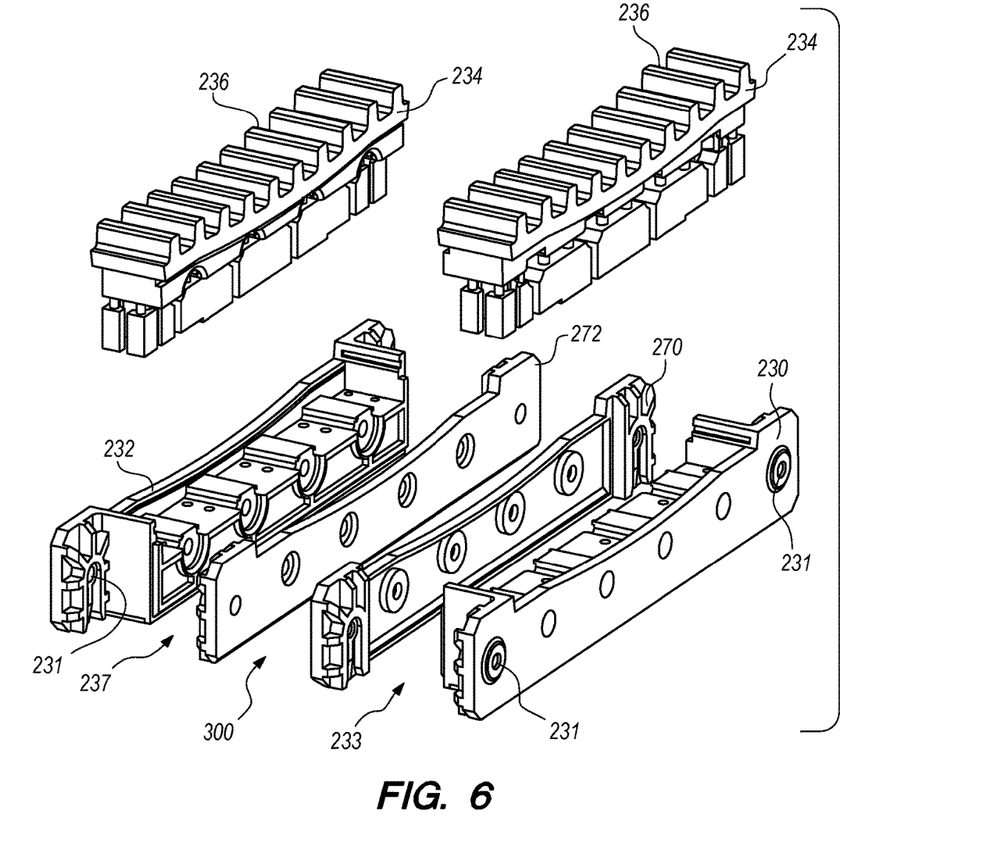
FIG. 6 shows an exploded and perspective view of a fastening segment, including a first gripping arm and a second gripping arm.

FIG. 6 shows an exploded view of a fastening segment (e.g., fastening segment 101, 102, or 103). As discussed above, the each fastening segment includes a first gripping arm 230 and a second gripping arm 232. A portion of a surface of first gripping arm 230 that faces a workpiece includes a gripping surface 234. Similarly, a portion of a surface of second gripping arm 232 that faces the workpiece includes a gripping surface 234. Each gripping surface 234 includes one or more raised gripping portions or teeth 236 that extend beyond gripping surface 234. During an operative state, raised teeth 236 of each fastening segment contacts and effectively grip the workpiece for a subsequent processing (e.g., cutting or shaping).

Figure 9:
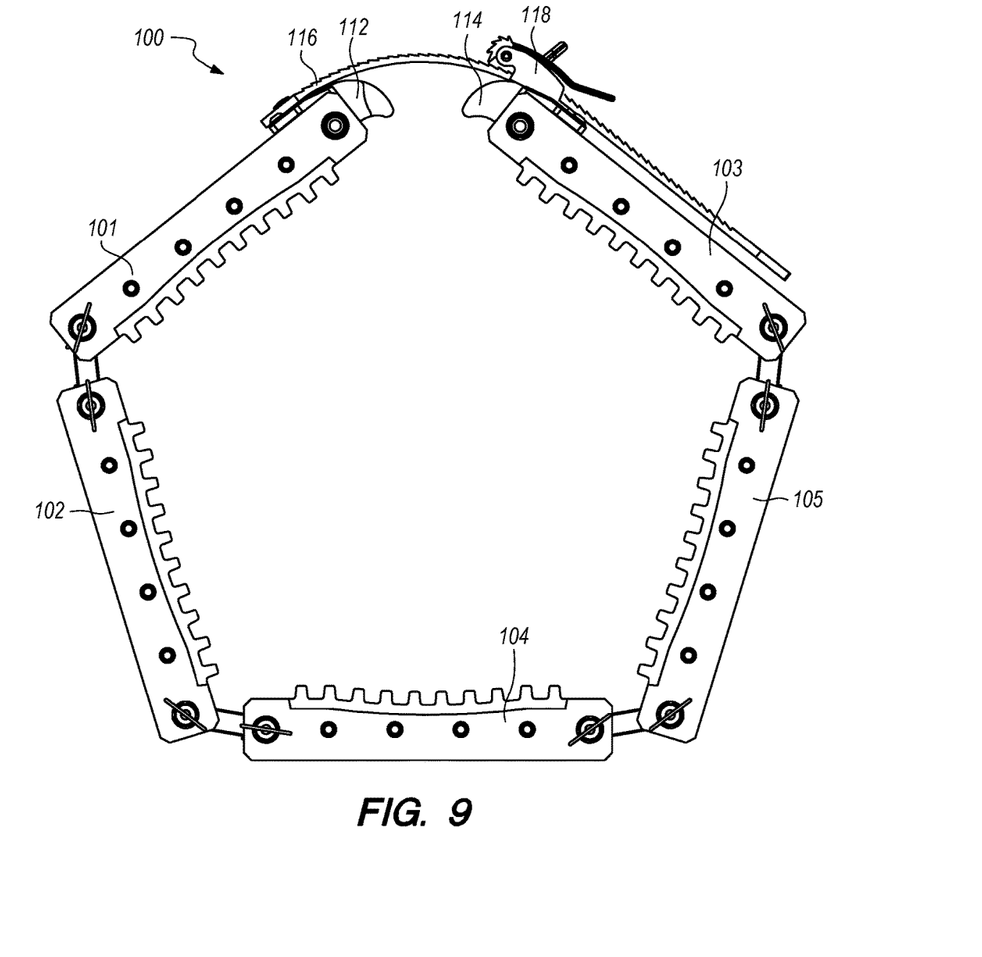
FIG. 9 shows an elevational view of a fastener, according to another embodiment of the present arrangements that includes five fastening segments.

In one embodiment, teeth 236 may be in a straight-line arrangement, as shown in FIG. 1. In another, preferred embodiment, teeth 236 may be disposed in a curved manner as shown in FIGS. 2 and 9, forming a concave surface that faces the workpiece.

In one embodiment of the present arrangements, gripping surface 234 and 236 are secured to first gripping arm 230 and second gripping arm 232, respectively, using a securing mechanism such as rivet, screw, nut and bolt and/or adhesive. In another embodiment of the present arrangements, gripping surface 234 and 236 are molded into first gripping arm 230 and second gripping arm 232, respectively, during the manufacturing process.

First gripping arm 230 and second gripping arm 232 further each include a cutting surface 270 and 272, respectively, that face each other. In an exemplar operative state of fastener 100, a cutting device would be between them. In one embodiment of the present arrangements, a plate (e.g., a metal plate) is cutting surface 270 of first gripping arm 230 and a second plate is cutting surface 272 of second gripping arm 232. Regardless of whether a plate is used, cutting surfaces 270 and 272 prevent damage to first gripping arm 230 and second gripping arm 232 when processing or cutting of the workpiece is occurring. In another embodiment of the present arrangements, each edge of cutting surfaces 270 and 272, which allows a cutting tool to pass through gap 200 and 300, defined between cutting surfaces 270 and 272, is chamfered to serve as an effective guide for the cutting tool.

Figure 7:
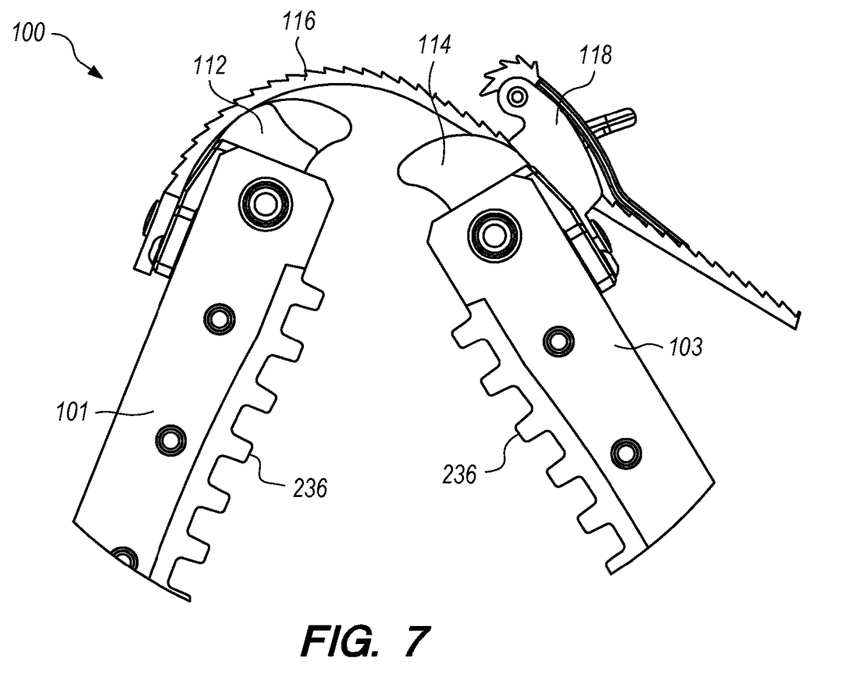
FIG. 7 shows a partial view of the engaging ends of the first and third fastening segments in an operative state, according to one embodiment of the present arrangements in which the tensioning belt engages with the ratcheting clip.

FIG. 7 illustrates a fastener 100, in one embodiment of the present arrangements and that includes a male engagement head 112, which need not engage with a female engagement head 114 to secure a workpiece. A workpiece, in certain instances, may be of a size wherein male engage head 112 cannot engage with female engagement head 114. Fastener 100, however, may still be used to safely secure a workpiece using the tensioning belt. In an exemplar operative state of fastener 100 when processing a such a workpiece, as shown in FIGS. 7 and 9, a tensioning belt 116 is engaged with and pushed through a ratcheting clip 118 to achieve an operative tension on belt 116 and until first fastening segment 101, second fastening segment (e.g., second fastening segment 102, not shown to simplify illustration) and third fastening segment 103 each contact the workpiece. In other words, tensioning belt 116 and ratcheting clip 118 pushes the engaging end of first fastening segment 101 towards the engaging end of third fastening segment 103 until teeth 236 of each fastening segment contact and connect with the workpiece. In this secured configuration, fastener 100 is fastened to and connected with the workpiece and, if desired, the workpiece may be safely cut using a cutting tool.

Figure 8:
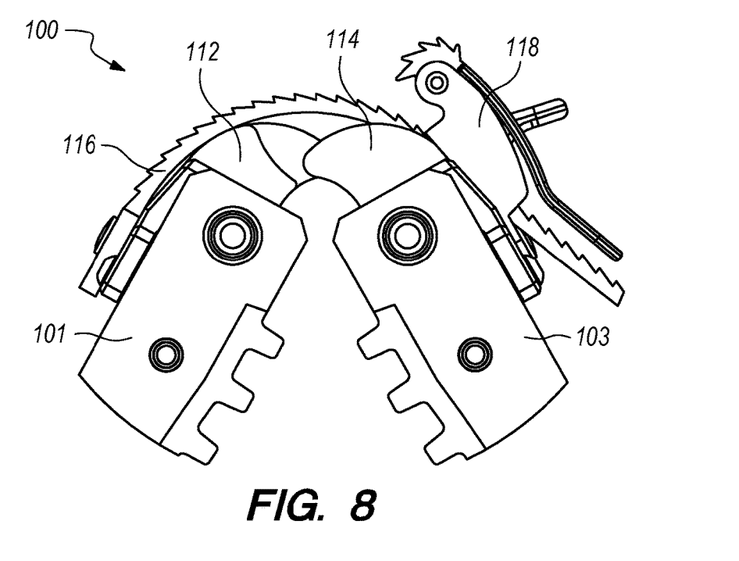
FIG. 8 shows another partial view of the engaging ends of the first and third fastening segments in another operative state, according to another embodiment of the present arrangements in which the tensioning belt engages with the ratcheting clip and the male engaging head engages with the female engaging head.
Figure 10:
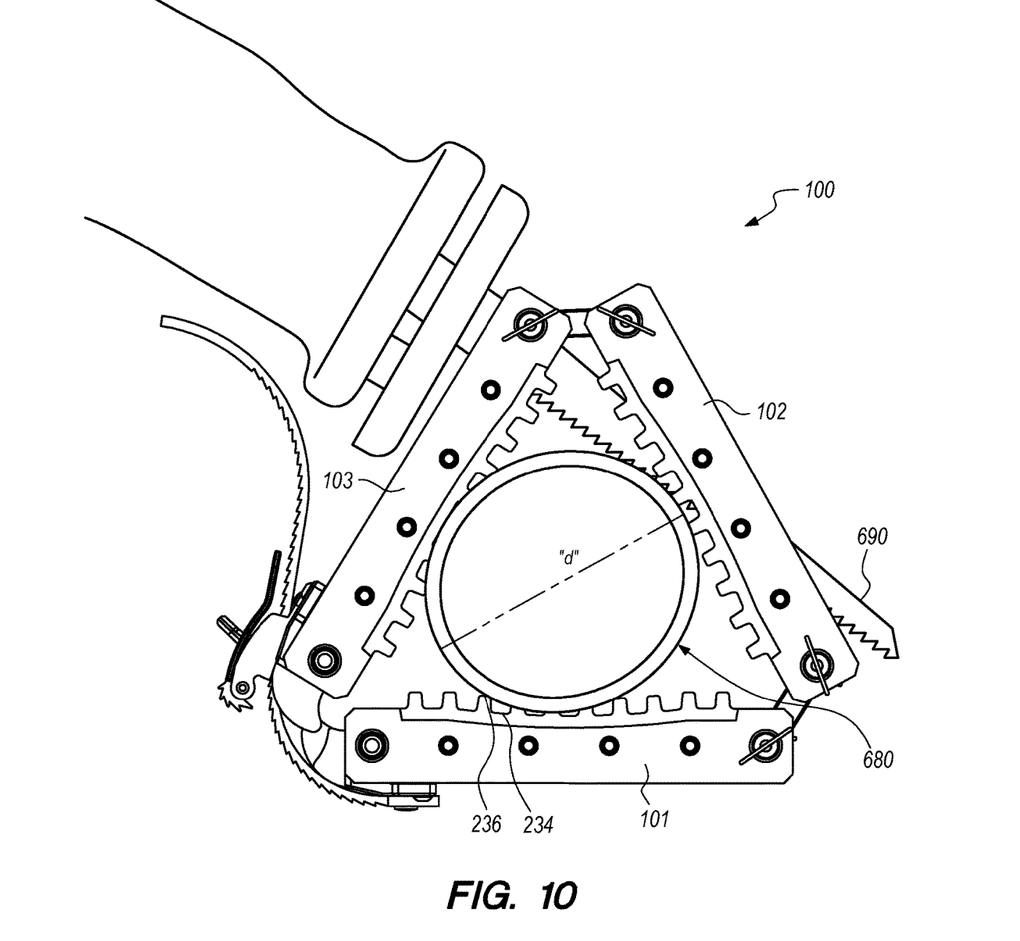
FIG. 10 shows an elevational view of the fastener in an operative state, securing a workpiece, with a saw blade cutting the workpiece.

FIGS. 8 and 10 shows a fastener 100, according to another embodiment of the present arrangements and that includes male engagement head 112 engaged with female spacer head 114 to secure a workpiece. In an operative state of fastener 100, teeth 236 of first fastening segment 101, second fastening segment (e.g., second fastening segment 102, not shown to simplify illustration) and third fastening segment 103 each contact the workpiece, securing it to, and connecting it with, fastener 100. Tensioning belt 116 is engaged and secured by ratcheting clip 118 to achieve an operative tension on belt 116 to prevent the engaging end of first fastening segment 101 from moving away from the engaging end of third fastening segment 103. In an engaged position, female engagement head 114 and male engagement head 112 prevent the fastening segments from moving in a direction that is perpendicular or at an angle to a cutting surfaces 270 and 272 of a fastening segment. In this configuration, female spacer head 114 and male spacer head 112 of fastener 100 provide a restriction in movement for the fastening segments and fasten the workpiece.

Those skilled in the art of fasteners will appreciate that a workpiece comes in a variety of shapes and sizes. In certain instances, a fastener with three fastening segments is not large enough to effectively secure a workpiece. The present arrangements, however, are not limited to three fastening segments. Rather, the fastener of the present arrangements may include three or more fastening segments. By way of example, FIG. 9 shows a fastener 100 with five fastening segments, i.e., first fastening segment 101 and third fastening segment 103 are engaging fastening segments, and second fastening segment 102, fourth fastening segment 104, and fifth fastening segment 105 are non-engaging fastening segments, with hinges at each end. Fourth fastening segment 104, and fifth fastening segment 105 are substantially similar to second fastening segment 102. It is apparent that as many fastening segments with two non-engaging ends may be added as needed to secure a workpiece, and that the number of fastening segments is unlimited.

First fastening segment 101 and third fastening segment 103 may be coupled together, as discussed above with respect to the embodiments shown in FIG. 8, by using a tensioning belt 116 and ratcheting clip 118. Furthermore, in certain operative states, male spacer head 112 and female spacer head 114 may provide additional fastening properties. The addition of non-engaging fourth fastening segment 104, and fifth fastening segment 105, and any number of additional fastening segments with hinges at each end, increases the size of the workpiece that may be secured in fastener 100.

FIG. 10 shows fastener 100 in an operative state, according to one embodiment of the present arrangements, and that is securing workpiece 680. FIG. 10 shows workpiece 680 as a pipe with a diameter "d". It is apparent that workpiece 680 may be any object that is gripped.

Gripping surface 234 and teeth 236 are found on first fastening segment 101, second fastening segment 102, and third fastening segment 103. A portion of teeth 236, and potentially gripping surface 234 on each fastening segment are in contact with workpiece 680. Gripping surface 234 and teeth 236 effectively grip workpiece 680 during processing. More particular, one or more raised teeth 236 of a gripping surface 234 contact and effectively grip workpiece 680 and hold it in place during processing. Preferably, teeth 236 are made of any material capable of undergoing elastic deformation. More preferably, teeth 236 are a material that has a spring constant such that the material's restoring force (i.e., the force the material exerts on workpiece 680 to restore the material to its equilibrium height) secures workpiece 680 in place.

In some instances workpiece may not have an even diameter. In these instances the workpiece may have an uneven surface, and gripping arm 230 of each fastening segment may move independently of gripping arm 232, within the range of motion permitted by connectors 260 and 262. In this manner, gripping arms 230 and 232 may more effectively secure and hold a workpiece with an uneven surface during the cutting procedure.

In use, the workpiece is secured by fastener 100, and cut by the blade of a cutting device inserted into gap 200 and 300. The first gripping arm of each fastening segment is in contact with the outside surface of a first side of the workpiece, and the second gripping arm of each fastening segment is in contact with the outside surface of a second side of the workpiece, where the first and second side are separated by the plane through which the blade of the cutting device will pass. After the blade cuts the workpiece, the fastener may retain both the first and second sides of the workpiece within the respective gripping arms. The first gripping arm of each fastening segment may remain securely connected with the first side of the workpiece, even after the workpiece is cut. Simultaneously, the second gripping arm of each fastening segment may remain securely connected with the second side of the workpiece, after the workpiece is cut. The ability of the gripping arms to securely retain each side of the workpiece is dependent on the weight of each side of the workpiece, combined with the length of each side of the workpiece.

Figure 12:
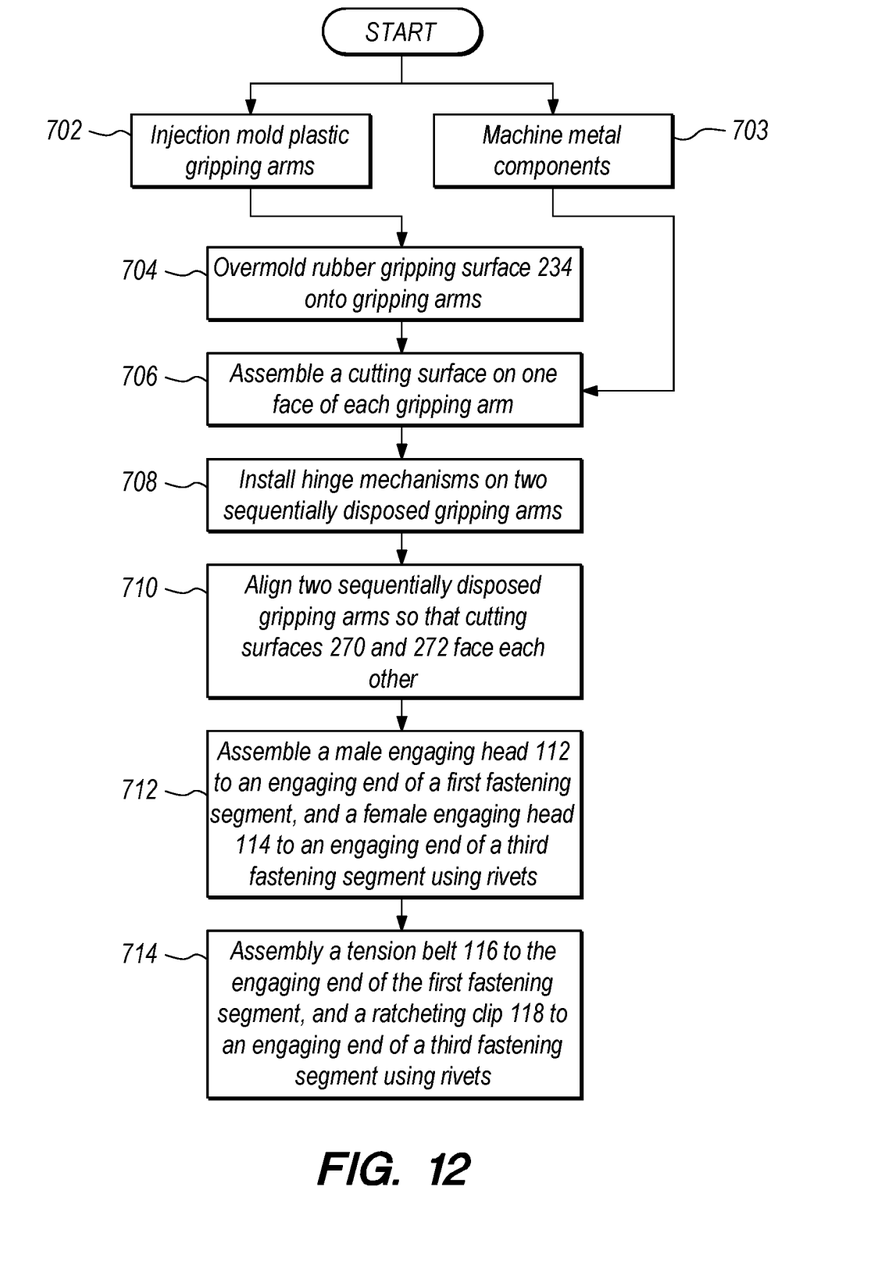
FIG. 12 shows a method of assembling, according to one embodiment of the present teachings, the fastener.

FIG. 12 shows a method of using fastener 100, according to one embodiment of the present teachings, to secure and cut a workpiece. A first step 802 includes obtaining a fastener 100 with at least three fastening segments, 101, 102, and 103, and adding, if necessary, sufficient fastening segments to securely accommodate and hold an object to be cut.

At step 804, the fastener is opened so that tensioning belt 116 and ratcheting clip 118 are unconnected, and male spacer head 112 and female spacer head 114 unconnected, as shown in FIG. 1. Step 804 further includes extending the fastener such that multiple fastening segments are substantially parallel to each other, although not necessarily flat.

Step 806 includes wrapping the fastener around a workpiece until tensioning belt 116 is in close proximity to ratcheting clip 118. Next, step 806 includes securing the fastener to the workpiece by feeding the tensioning belt 116 into the ratcheting clip 118 until each fastening segment of the multiple fastening segments securely contacts the workpiece.

Step 808 optionally includes tightening the fastener until male egngement head 112 is engaged with female engagement head 114.

Step 810 includes positioning a reciprocating saw, or any other cutting device with a blade (hereafter collectively "saw") that fits between gap 200 and gap 300 within fastener 100. The cutting edge of the saw blade is preferably positioned at gap 200 between connectors 260 and 262 of any hinge end of a fastening segment.

At step 812 the workpiece is cut by turning on and operating a saw, and proceeding by moving the saw from gap 200, through gap 300 as the workpiece is cut by the cutting edge of the saw blade. Cutting surfaces 272 keep the saw blade aligned within gap 300, and enable and ensure a square cut of a pipe or other workpiece.

At step 814, the saw blade may cut a workpiece as far as desired but no farther than spacer 224 or spacer 226 and/or no farther than fastening heads 12 and 114. As shown in FIG. 5, spacer 226 is positioned between a first gripping arm 230 and a second gripping arm 232, and flush with cutting surface 272 of each gripping arm at the engaging end of fastening segment 103. The width of gap 300 is substantially equivalent to the width of spacer 226. Spacer 224 is likewise positioned between a first gripping arm 230 and a second gripping arm 232, as shown in exploded view in FIG. 2. Spacer 224 is flush with cutting surface 272 of each gripping arm at the engaging end of first fastening segment 101. The width of gap 300 is substantially equivalent to the width of spacer 224. Upon encountering spacer 224 or spacer 226, the saw blade 690 is prevented from cutting or moving beyond either spacer 224 or spacer 226. In the unlikely event that the saw blade cut through the spacers, male engagement head 112 and female engagement head 114 will also stop the saw blade from progressing farther, or cutting beyond the fastening heads. The cutting device blade is thereby prevented from moving beyond the engaging ends of the first fastening segment and the third fastening segment. This can provide protection, if needed, to prevent other objects from being cut by the saw blade.

In some embodiments, the fastener may be used to rescue a person trapped inside a vehicle, or other metal object. In these instances, the fastener may be deployed as described above, by wrapping the fastener around the object to be cut. When the object is located near a person, the engaging ends of the first and third segment may be positioned toward the person. In this manner, the person will be protected from the saw blade, because the saw blade will be prevented from cutting beyond the spacers and male and female engagement heads.

Figure 13:
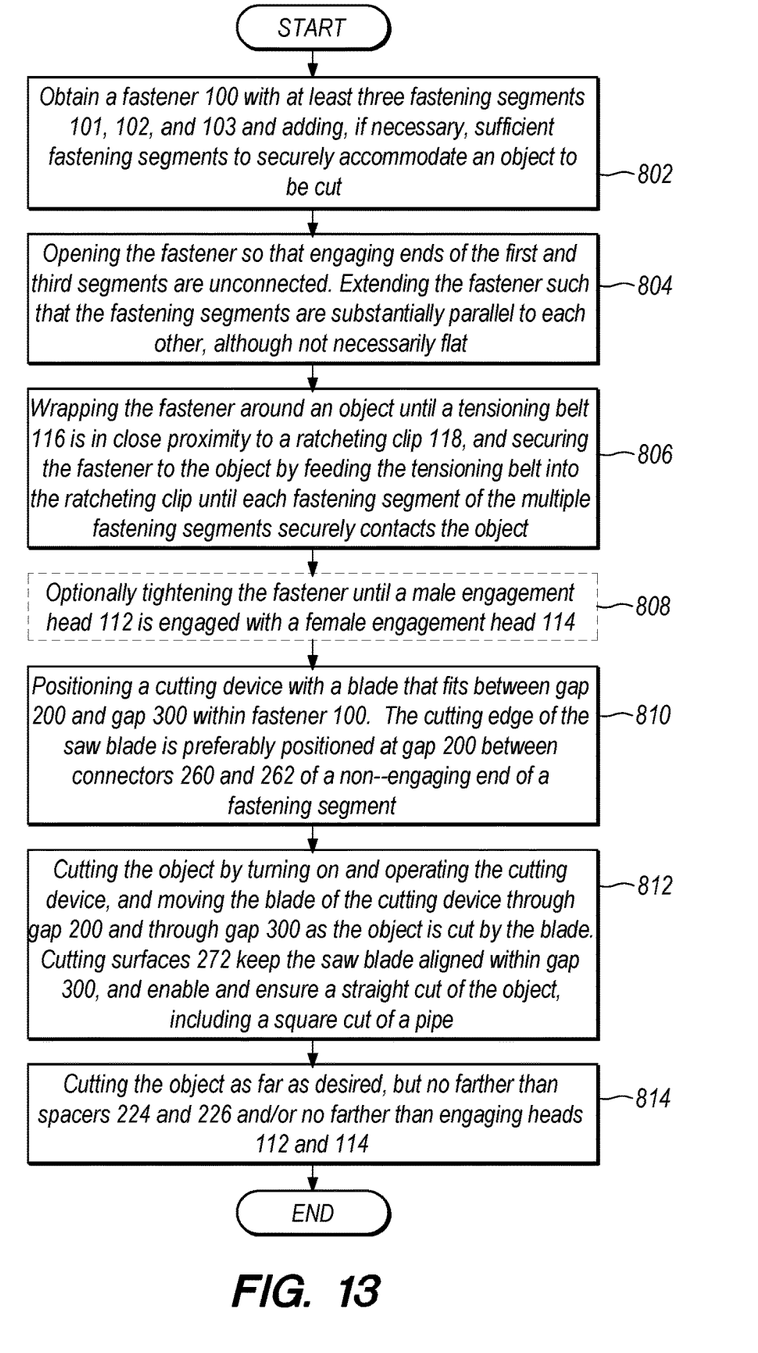
FIG. 13 shows a method using, according to one embodiment of the present teachings, the fastener.

The present invention also offers novel methods of assembling a fastener 100. In one embodiment of the present teachings, a method of assembling a fastener begins with a step 702, which includes injection molding a frame or gripping arms 230 and 232. Gripping arms may be made of any material capable of fastening to a workpiece. Preferably, gripping arms 230 and 232 are made of plastic. By way of example, the material may be at least one material chosen from a group comprising nylon, acrylic, polyvinylchloride, polythene, polypropylene, bakelite, and epoxy resin mixed with fibers.

Next, a step 704 includes overmolding rubber grippers or gripping surface 234 onto the gripping arms of step 702. Overmolding includes combines the gripping arm 232 and gripping surface 234 into a single finished product.

A step 706 comprises assembling a cutting surface 270 to each gripping arm 232. In one embodiment of the present teachings, rivets secure the cutting surface to the gripping arm.

Next, a step 708 includes installing hinge mechanims (e.g., first connector 260 and second connector 262) onto two sequentially disposed gripping arms. By way of example, a connector 260 is installed between first gripping 230 of first segment 101 and first gripping arm 230 of second segment 102. In one embodiment of the present teachings, a rivet may be used to connect the connector to each gripping arm. In another embodiment, a ball-pin lock 263, optionally with an o-ring may be used to connect a connector to a gripping arm A step 710 includes aligning the assembled gripping arms together so that cutting surfaces 270 and 272 of each gripping arm faces each other, thus creating multiple fastening segments (e.g., fastening segments 101, 102, 103 of FIG. 1).

A step 712 includes assembling a male engaging head 112 to an engaging fastening segment (e.g., first fastening segment 101 of FIG. 1) and a female spacer head 114 to another engaging fastening segment (e.g., third fastening segment 103 of FIG. 1) using rivets. Another step 714 includes assembling or securing tensioning belt 116 to an engaging fastening segment using rivet 221 and a ratcheting clip 118 to another engaging fastening segment using rivet 221.

Although illustrative embodiments of this invention have been shown and described, other modifications, changes, and substitutions are intended. Accordingly, it is appropriate that the disclosure be construed broadly.

What is claimed is:

1. A fastener comprising:
   three or more fastening segments, wherein two of said fastening segments are engaging fastening segments and one of said engaging fastening segments includes, at an engaging end, an engaging feature of a first type and the other of said engaging fastening segments includes, at an engaging end, an engaging feature of a second type such that in an operative state of said fastening segments, engaging feature of said first type and engaging feature of said second type engage with each other, and wherein one or more fastening segments are non-engaging fastening segments and do not include an engaging feature;
   one or more hinges disposed on each of said fastening segments, wherein a non-engaging end of each engaging fastening segment includes at least one hinge and each end of said non-engaging fastening segments include at least one hinge; and
   at least two hinge mechanisms, at least one of which couples said hinge disposed at one end of said non-engaging fastening segments with said hinge disposed at said non-engaging end of one engaging fastening segment, and wherein at least another of said two hinge mechanisms couples said hinge disposed at another end of said non-engaging fastening segment with said hinge disposed at said non-engaging end of said another engaging fastening segment, or wherein at least another of said two hinge mechanisms couples a hinge at one end of another non-engaging fastening segment with said hinge disposed at said non-engaging end of said another engaging fastening segment;
   wherein each of said fastening segments includes a pair of complementary gripping arms that are disposed adjacent to each other such that at least a portion of a surface of said one gripping arm faces at least a portion of a surface another gripping arm; and
   a strap and a strap lock, such that during said operative state of said fastening segments, said strap engages with said strap lock to such that said fastening segments effectively secure a workpiece.

2. The fastener of claim 1, further comprising a gap defined between each of said complementary gripping arms such that a cutting tool blade accesses, through said gap, a workpiece that is secured by three or more of said fastening segments.

3. The fastener of claim 1, wherein each hinge mechanism comprises a complementary pair of connectors such that a first connector couples a first set of two sequentially disposed gripping arms, each of which is part of different fastening segments and a second complementary connector couples a second set of two sequentially disposed gripping arms, each of which is part of said different fastening segments, and wherein each of said two complementary gripping arms are adjacent to each other and in this configuration, said first set and said second set of two sequentially disposed gripping arms are adjacent to each other and said complementary pair of connectors allow each of said first and said second sequentially disposed gripping arms to move independently of each other.

4. The fastener of claim 3, wherein said complementary pair of connectors include a gap defined between such that at least a portion of a cutting tool blade accesses, through said gap, a workpiece that is secured by three or more of said fastening segments.

5. The fastener of claim 1, wherein each hinge include a first hinge that occupies an aperture defined in a first gripping arm and a second hinge that occupies an aperture defined in a second gripping arm, wherein said first gripping arm is complementary and sequentially disposed to said second gripping arm.

* * * * *